US010029692B2

(12) United States Patent
Nakoji et al.

(10) Patent No.: US 10,029,692 B2
(45) Date of Patent: Jul. 24, 2018

(54) VEHICLE DRIVE SYSTEM

(71) Applicant: HONDA MOTOR CO., LTD., Tokyo (JP)

(72) Inventors: Yasushi Nakoji, Wako (JP); Takaaki Kuwabara, Wako (JP); Takashi Hoshi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 15/455,130

(22) Filed: Mar. 10, 2017

(65) Prior Publication Data

US 2017/0267239 A1    Sep. 21, 2017

(30) Foreign Application Priority Data

Mar. 18, 2016  (JP) ................................. 2016-054681

(51) Int. Cl.
*B60W 30/18*     (2012.01)
*B60W 30/184*    (2012.01)
(Continued)

(52) U.S. Cl.
CPC ........... *B60W 30/184* (2013.01); *B60K 28/10* (2013.01); *B60W 10/06* (2013.01); *B60W 10/10* (2013.01);
(Continued)

(58) Field of Classification Search
CPC .... B60W 30/18; B60W 30/184; B60W 28/10; B60W 10/10; B60W 10/06; F02D 41/14; F02D 41/1498; F02D 41/16
See application file for complete search history.

(56) References Cited

U.S. PATENT DOCUMENTS 5,379,634 A * 1/1995 Kuroda ................. G01M 15/11
                                                  73/114.04
9,056,613 B2 * 6/2015 Johri ..................... B60W 10/08

FOREIGN PATENT DOCUMENTS

JP        04-362232       2/1992
JP        3167352 B2     12/1992
(Continued)

OTHER PUBLICATIONS

Japanese Office Action for corresponding JP Application No. 2016-054681, dated Sep. 12, 2017.

*Primary Examiner* — Hieu T Vo
(74) *Attorney, Agent, or Firm* — Mori & Ward, LLP

(57) ABSTRACT

A vehicle drive system includes an internal combustion engine, a clutch, an engine rotation speed detector, an output shaft rotation speed detector, and a processor. The internal combustion engine includes cylinders and a crankshaft. The clutch is connected to the crankshaft via a torsion element and includes an output shaft. The engine rotation speed detector detects a crankshaft rotation speed. The output shaft rotation speed detector detects an output shaft rotation speed. The processor is configured to calculate a torque generated in each of the cylinders based on the crankshaft rotation speed. The processor is configured to decrease transmission torque of the clutch so that a difference between the crankshaft rotation speed and the output shaft rotation speed to be a target value when misfiring occurs. The processor is configured to identify a misfiring cylinder among the cylinders based on the torque calculated while the transmission torque is decreased.

10 Claims, 8 Drawing Sheets

(51) Int. Cl.
  *B60K 28/10* (2006.01)
  *F02D 41/14* (2006.01)
  *B60W 10/06* (2006.01)
  *B60W 10/10* (2012.01)
  *F02D 41/16* (2006.01)
  *G01M 15/11* (2006.01)

(52) U.S. Cl.
  CPC ......... *F02D 41/1498* (2013.01); *F02D 41/16* (2013.01); *G01M 15/11* (2013.01); *B60W 2510/0638* (2013.01); *B60W 2710/021* (2013.01); *B60Y 2300/435* (2013.01); *F02D 2200/101* (2013.01); *F02D 2200/1015* (2013.01)

(56) References Cited

FOREIGN PATENT DOCUMENTS

| | | | |
|---|---|---|---|
| JP | 10-331707 | 2/1998 | |
| JP | 2007-069860 | 3/2007 | |
| JP | 2010-001829 | 1/2010 | |
| JP | 5844162 B2 | 10/2012 | |
| JP | 2013072317 A | * 4/2013 | ............. F02D 45/00 |

* cited by examiner

VEHICLE DRIVE SYSTEM

CROSS-REFERENCE TO RELATED APPLICATIONS

The present application claims priority under 35 U.S.C. § 119 to Japanese Patent Application No. 2016-054681, filed Mar. 18, 2016, entitled "Vehicle Drive Device." The contents of this application are incorporated herein by reference in their entirety.

BACKGROUND

1. Field

The present application relates to a vehicle drive system.

2. Description of the Related Art

Japanese Patent No. 5844162 describes an internal combustion engine misfire detection device for application to a vehicle drive device in which the crankshaft of the internal combustion engine is coupled to an input shaft of a transmission gear unit through a torsion element (for example, a dual-mass flywheel) and a clutch. In such a device, an engine rotation speed parameter indicating the rotation speed of the crankshaft is detected, and a corrected engine rotation speed parameter, corrected to remove the effect of the torsion element on the detected engine rotation speed parameter, is computed. Misfire detection is then performed based on fluctuations in the corrected engine rotation speed parameter.

Japanese Patent No. 3167352 describes a device that, in a vehicle drive device having a crankshaft of an internal combustion engine coupled to a vehicle drive shaft through an automatic transmission gear unit, performs misfire detection having eliminated the effects of road vibration by placing a lockup clutch of the automatic transmission gear unit in an uncoupled state or a state close to the uncoupled state.

SUMMARY

According to a first aspect of the present invention, a vehicle drive system includes an internal combustion engine having plural cylinders. A crankshaft of the engine is connected to a motive force transmission mechanism through a torsion element and a clutch, and the motive force transmission mechanism is coupled to a driveshaft of a vehicle. The vehicle drive device includes an engine rotation speed parameter detection unit that detects an engine rotation speed parameter indicating the rotation speed of the crankshaft, and an output shaft rotation speed parameter detection unit that detects an output shaft rotation speed parameter indicating a rotation speed of an output shaft of the clutch. The vehicle drive device also includes a misfire determination parameter computation unit that computes a misfire determination parameter indicating torque generated for each cylinder of the engine based on the detected engine rotation speed parameter, and a misfire determination unit that determines misfiring of the engine based on the misfire determination parameter. The vehicle drive device includes a transmission torque reduction control unit that, when misfiring of the engine has been detected by the misfire determination unit, decreases transmission torque of the clutch so as to match a difference between the engine rotation speed parameter and the output shaft rotation speed parameter to a target value, and a misfiring cylinder identification unit that identifies cylinders in which misfiring is occurring based on the misfire determination parameter computed in a state in which the transmission torque has been decreased by the transmission torque reduction control unit.

According to a second aspect of the present invention, a vehicle drive system includes an internal combustion engine, a clutch, an engine rotation speed detector, an output shaft rotation speed detector, and a processor. The internal combustion engine includes cylinders and a crankshaft. The clutch is connected to the crankshaft via a torsion element. The clutch includes an output shaft. The engine rotation speed detector detects a crankshaft rotation speed. The output shaft rotation speed detector detects an output shaft rotation speed of the clutch. The processor is configured to calculate a torque generated in each of the cylinders based on the crankshaft rotation speed. The processor is configured to determine whether misfiring occurs in the engine based on the torque calculated. The processor is configured to decrease transmission torque of the clutch so that a difference between the crankshaft rotation speed and the output shaft rotation speed to be a target value when it is determined that misfiring occurs. The processor is configured to identify a misfiring cylinder among the cylinders based on the torque calculated while the transmission torque is decreased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
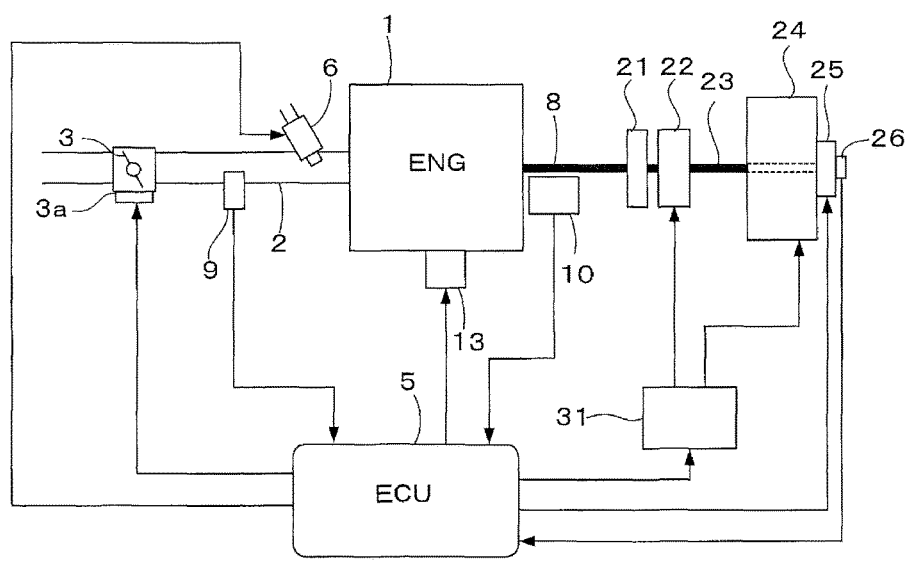
FIG. 1 is a diagram illustrating configuration of relevant parts of a vehicle drive device according to an embodiment of the present application.

The embodiments will now be described with reference to the accompanying drawings, wherein like reference numerals designate corresponding or identical elements throughout the various drawings.

Explanation follows regarding embodiments of the present application, with reference to the drawings.

First Embodiment

FIG. 1 shows a configuration of relevant parts of a vehicle drive device (or system) according to an embodiment of the present application. An internal combustion engine (referred to simply as engine below) 1 has, for example, six cylinders, and includes an air intake pipe 2. A throttle valve 3 is provided to the intake pipe 2. A variable opening actuator 3*a* is provided to the throttle valve 3, and the actuator 3*a* is connected to an electronic control unit (referred to as ECU below) 5. The ECU 5 is actually configured by plural ECUs, connected together through a communication network. The configuration of such an ECU is known, and is accordingly indicated by a single ECU 5.

A fuel injection valve 6 is provided to each of the cylinders, between the engine 1 and the throttle valve 3, and slightly to the upstream side of a non-illustrated intake valve of the intake pipe 2. Each of the injection valves is connected to a fuel pump, not illustrated in the drawings, and is also electrically connected to the ECU 5. Respective spark plugs 13 for each of the cylinders of the engine 1 are connected to the ECU 5, and ignition timings are controlled by ignition signals from the ECU 5.

An intake pressure sensor 9 for detecting an intake pressure PBA is provided at the downstream side of the throttle valve 3 of the intake pipe 2, and supplies a detection signal of the intake pressure PBA to the ECU 5.

A crank angle position sensor 10 for detecting a rotation angle of a crankshaft 8 of the engine 1 is connected to the ECU 5, and a signal corresponding to the rotation angle of the crankshaft is supplied to the ECU 5. The crank angle position sensor 10 is configured from: a cylinder determination sensor for outputting a pulse (referred to as CYL pulse below) at a specific crank angle position of a particular cylinder of the engine 1; a TDC sensor for outputting a TDC pulse at crank angle positions (at a crank angle of every 120° in six cylinder engines) in front of specific crank angles, relative to the top dead center (TDC) at the start of the intake process of each cylinder; and a CRK sensor that generates a single pulse (referred to as a CRK pulse below) at a shorter constant crank angle period (such as a period of 6°) than the TDC pulse. The crank angle position sensor 10 supplies the CYL pulse, the TDC pulse, and the CRK pulse to the ECU 5. These pulses are employed to control various timings, such as the fuel injection timing and the ignition timing, and to detect engine revolutions (engine rotation speed) NE. The ECU 5 converts a CRK pulse generation time interval (referred to as timing parameter below) CRME into a crankshaft rotation speed OMGCRK indicating the rotation speed of the crankshaft 8, and detects misfiring of the engine 1 based on the crankshaft rotation speed OMGCRK. The engine revolutions NE is normally indicated in rpm, and corresponds to a moving average value of the crankshaft rotation speed OMGCRK normally indicated in rad/s.

The CRK sensor includes a pulse wheel fixed to the crankshaft and formed with teeth at a fixed angular spacing on an outer peripheral portion of the pulse wheel, and a pickup coil disposed facing the pulse wheel. The pickup coil generates an alternating current signal according to rotation of the pulse wheel, and the alternating current signal is converted into the CRK pulse and output.

The crankshaft 8 of the engine 1 is coupled to a main shaft (input shaft) 23 of a transmission gear unit 24, through a torsion element 21 and a clutch 22. A dual-mass flywheel or a clutch damper (torsion damper provided between a clutch plate and a shaft of the clutch 22), for example, is employed as the torsion element 21. A motor 25 capable of directly driving rotation of the main shaft 23 is provided to the transmission gear unit 24, and the motor 25 includes a resolver 26 for detecting the rotation speed of the motor 25. A detection signal of the resolver 26 is supplied to the ECU 5. A rotation speed OMGOS of the main shaft 23 (the output shaft of the clutch 22) (referred to as output shaft rotation speed below) is computed in the ECU 5 based on the detection signal of the resolver 26.

An output shaft (not illustrated in the drawings) of the transmission gear unit 24 is coupled to a drive shaft for driving a drive wheel of the vehicle through a force transmission mechanism, not illustrated in the drawings. Operation of the clutch 22 and the transmission gear unit 24 is controlled by an actuator 31. The actuator 31 is connected to the ECU 5.

In addition to the intake pressure sensor 9 and the crank angle position sensor 10 described above, other sensors, not illustrated in the drawings, are also connected to the ECU 5 (for example, a cooling water temperature sensor for detecting an engine cooling water temperature TW, an accelerator sensor for detecting an acceleration pedal depression amount AP of the vehicle, a vehicle speed sensor for detecting a vehicle speed VP, and a throttle valve opening sensor for detecting the degree of opening of the throttle valve 3). The detection signals from these sensors are supplied to the ECU 5.

Based on the detection signals from the various sensors described above, the ECU 5 performs fuel injection control using the fuel injection valve 6, ignition control using the spark plugs 13, air intake volume control using the throttle valve 3, coupling/decoupling control of the clutch 22, transmission gear control of the transmission gear unit 24, and drive control (regeneration control) of the motor 25. The ECU 5 also performs misfire detection in the engine 1 (including identification of the cylinder where misfiring occurs), explained in detail as follows.

The present embodiment basically performs misfire detection including misfiring cylinder identification by employing a method (referred to below as a basic misfire determination method) described in Japanese Patent No. 5203514, the entire contents of which are incorporated herein by reference. However, due the precision of misfiring cylinder identification sometimes being reduced in a particular engine running state in determination employing the basic misfire determination method alone, misfiring cylinder identification is performed using the basic misfire determination method in a state in which the clutch transmission torque is decreased by slightly slipping the clutch 22.

The basic misfire determination method is basically configured to include the following steps:
1) computing an average change amount OMGCAV of the crankshaft rotation speed OMGCRK in an angular period of 720° crank angle, and computing an inertial speed change component OMGI accompanying rotation of the crankshaft;
2) computing a corrected crankshaft rotation speed OMGMA by correcting the crankshaft rotation speed OMGCRK according to the average change amount OMGCAV and the inertial speed change component OMGI; and
3) computing a misfire determination parameter MFPARAM by integrating a difference between a reference value OMGMATDC, this being the corrected crankshaft rotation speed OMGMA corresponding to the crankshaft rotation speed OMGCRK detected at a reference timing when the piston of the cylinder subjected to misfire determination is close to the compressed top dead center (the combustion process initial top dead center), and the corrected crankshaft rotation speed OMGMA, over an integration period of 720/N (wherein N is the number of cylinders).
4) determining misfire to have occurred in the subject cylinder when the misfire determination parameter MFPARAM is smaller than a determination threshold value MFJUD (set, for example, to O).

The misfire determination parameter MFPARAM computed at step 3 is a parameter indicating the torque generated by combustion in the subject cylinder, and the value of misfire determination parameter MFPARAM is a negative value in a misfiring cylinder. Thus, for a determination threshold value MFJUD set to 0, the occurrence of misfiring can be determined when the misfire determination parameter MFPARAM is smaller than the determination threshold value MFJUD.

Figure 2:
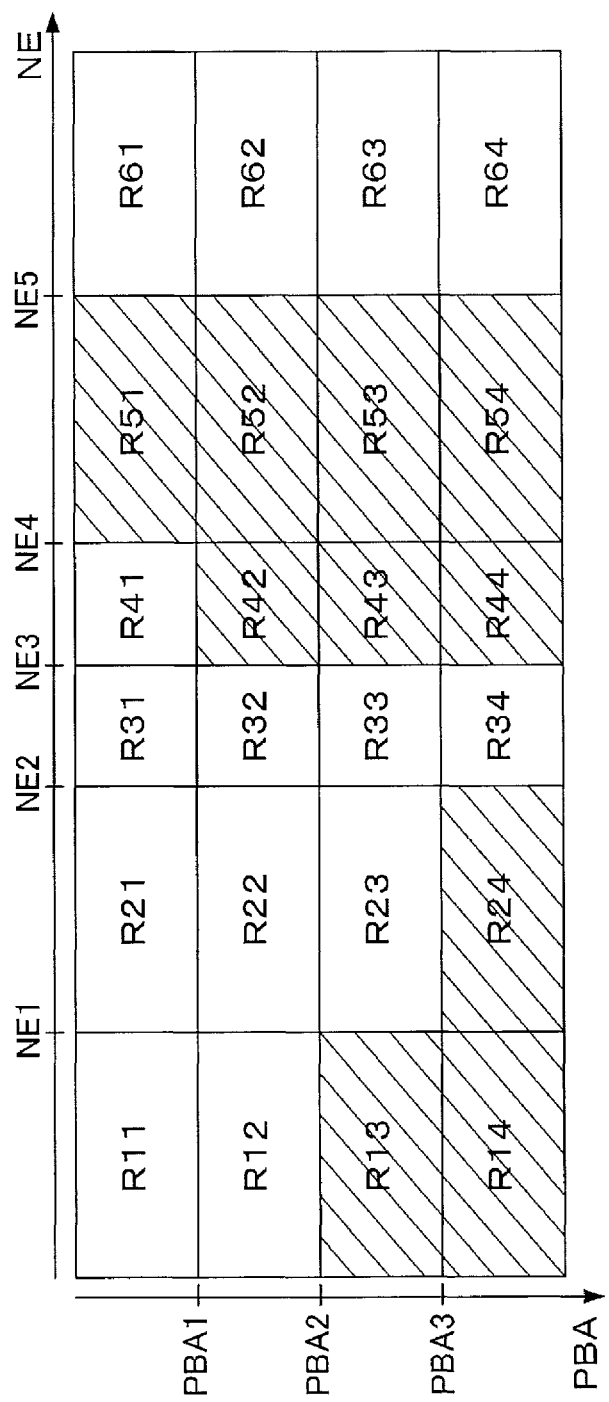
FIG. 2 is a diagram to explain engine running regions where the precision of determining misfiring cylinders is reduced.

FIG. 2 is a diagram to explain the particular engine running state mentioned above, and indicates engine running regions R11 to R64, as defined by the engine revolutions NE and the intake pressure PBA. NE1 to NE5 in FIG. 2 are respectively engine revolutions of about 1500 rpm, 2000 rpm, 2250 rpm, 2500 rpm, and 3000 rpm. PBA1 to PBA3 are respectively intake pressures of about 65 kPa, 80 kPa, and 100 kPa.

The hatched regions R13, R14, R24, R42 to R44, and R51 to R54 in FIG. 2 indicate regions where it has been confirmed that mistaken determination of a misfiring cylinder occurs when the basic misfire determination method is applied alone.

Figure 3A:
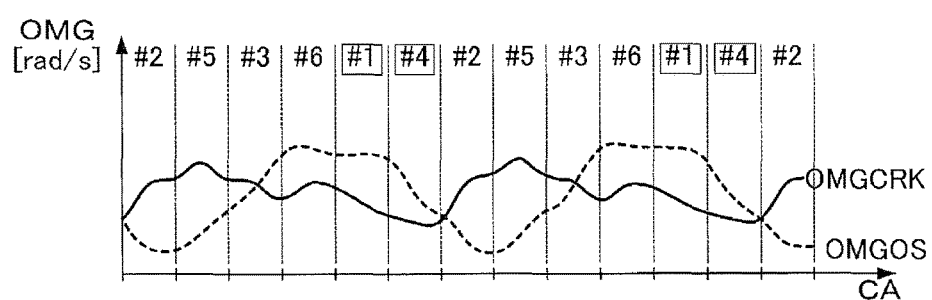
FIG. 3A and FIG. 3B are timing charts indicating movement in crankshaft rotation speed and output shaft rotation speed for a case in which misfiring occurs in particular cylinders.

FIG. 3A is a timing chart indicating movement in the crankshaft rotation speed OMGCRK (solid line) and the output shaft rotation speed OMGOS (dashed line) for a case in which successive misfiring occurs in region R42 for the cylinder #1 and the cylinder #4. The crank angle CA is indicated along the horizontal axis, with the number of the cylinder in the combustion process indicated at the top.

Figure 4A:
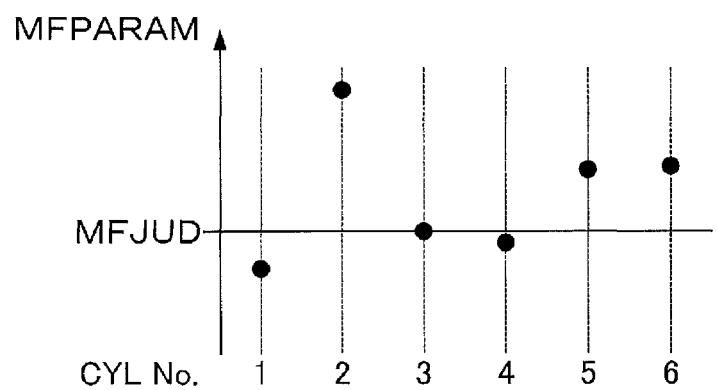
FIG. 4A and FIG. 4B are diagrams illustrating relationships between a value of a misfire determination parameter and a determination threshold value for each cylinder.

With respect to the crankshaft rotation speed OMGCRK, the amount of decrease is small in the combustion process for cylinder #4, and the amount of decrease is large in the combustion process for cylinder #3. The misfire determination parameter MFPARAM, computed by employing the basic misfire determination method and indicating the generated torque for each cylinder, is computed for each cylinder and is as indicated in FIG. 4A. Namely, both the misfire determination parameter MFPARAM of cylinder #3 where misfiring does not occur, and the misfire determination parameter MFPARAM of cylinder #4 where misfiring does occur, are values substantially the same as the determination threshold value MFJUD (set, for example, to 0), and so cylinder #4 cannot be correctly determined as a misfiring cylinder. In cylinder #1, the misfire determination parameter MFPARAM is smaller than the determination threshold value MFJUD, and so it is a possible to determine that cylinder #1 is a misfiring cylinder.

Such a decrease in determination precision is confirmed to occur due to fluctuations in the output shaft rotation speed OMGOS, as indicated by the dashed line in FIG. 3A, affecting the crankshaft rotation speed OMGCRK through the torsion element 21. To address this issue, the present embodiment temporarily lowers the transmission torque of the clutch 22 (slips the clutch 22) when successive misfiring is determined to have occurred in any of the cylinders, and adjusts the degree of engagement of the clutch 22 such that the output shaft rotation speed OMGOS is lower than the crankshaft rotation speed OMGCRK by about 150 rpm, for example. In other words, transmission torque reduction control is executed to adjust the degree of engagement of the clutch 22 to match the difference between the output shaft rotation speed OMGOS and the crankshaft rotation speed OMGCRK (referred to as differential rotation speed DOMG below) to a target value DOMGT (for example, 150 rpm (5π rad/s)), determination is performed in this state using the basic misfire determination method, and the misfiring cylinder is identified. The target value DOMGT is set to a value that is capable of reducing effects on rotation of the crankshaft from rotation fluctuations on the output side of the clutch 22, and that is within a range over which the temperature of the clutch 22 does not rise excessively.

Figure 3B:
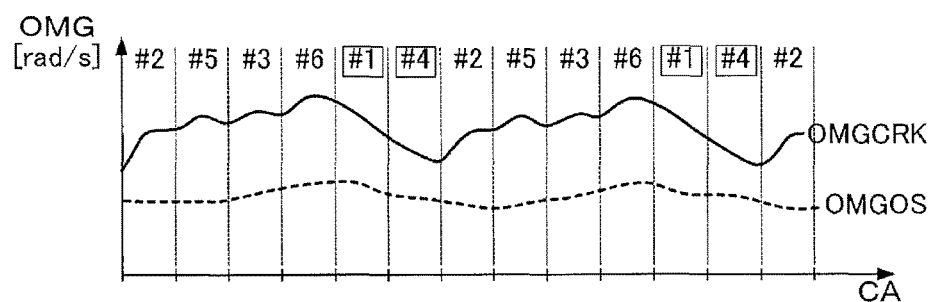
Figure 4B:
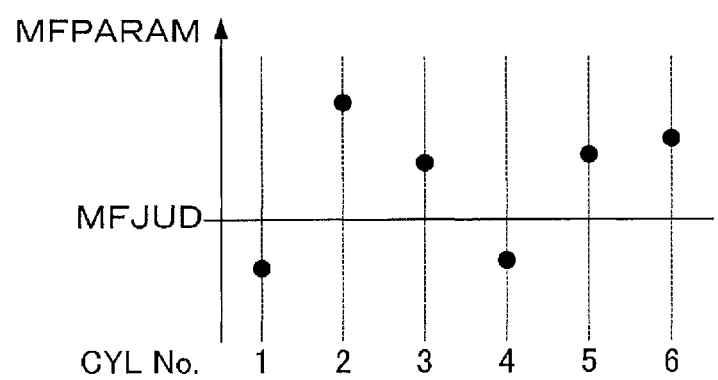

FIG. 3B is a timing chart indicating movement in the crankshaft rotation speed OMGCRK (solid line) and the output shaft rotation speed OMGOS (dashed line) for when successive misfiring occurs in the cylinder #1 and the cylinder #4, similarly to in FIG. 3A, but for a case in which transmission torque reduction control is executed. Fluctuations in the output shaft rotation speed OMGOS are reduced by slipping the clutch 22, enabling confirmation that the crankshaft rotation speed OMGCRK definitely decreases in the combustion process of the misfiring cylinders (#1, #4). As a result, as illustrated in FIG. 4B, the misfire determination parameter MFPARAM becomes smaller than the determination threshold value MFJUD in the misfiring cylinders (#1, #4), enabling the misfiring cylinders to be correctly identified.

Figure 5:
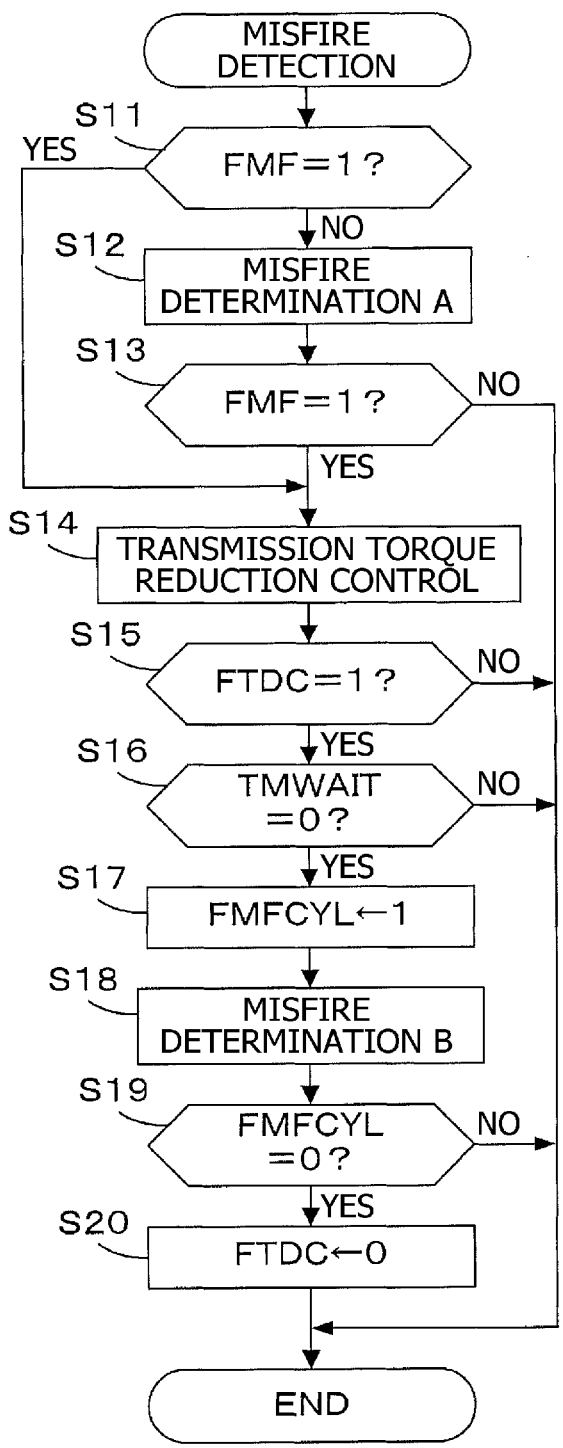
FIG. 5 is a flowchart of misfire detection processing (in a first embodiment).

FIG. 5 is a flowchart of processing to execute the misfire detection described above, and this processing is executed in synchronization with the TDC pulse generated by the ECU 5.

At step S11, determination is made as to whether or not a misfire detection flag FMF has already been set to 1. The misfire detection flag FMF is set to 1 when successive misfiring has been detected in the processing of step S12. Successive misfiring is a state in which it is determined that misfiring has occurred successively a specific number of times NMF (for example, about 15 times) in any of the cylinders (with no limitation to a single cylinder). Processing proceeds immediately to step S14 when the answer at step S11 is affirmative (YES).

When the answer at step S11 is negative (NO), misfire determination A is executed at step S12 using the basic misfire determination method, and the misfire detection flag FMF is set to 1 when successive misfiring has been detected. At step S13, determination is made as to whether or not the misfire detection flag FMF is 1, and processing is ended immediately when the answer is negative (NO).

When the answer at step S13 is affirmative (YES), transmission torque reduction control is executed (step S14), and determination is made as to whether or not a target value attainment flag FTDC is 1 (step S15). The target value attainment flag FTDC is set to 1 when the differential rotation speed DOMG in transmission torque reduction control reaches the target value DOMGT. Processing is ended immediately when the answer at step S15 is negative (NO).

When the answer at step S15 is affirmative (YES), determination is made as to whether or not a value of a timer TMWAIT is 0 (step S16). The timer TWAIT is set to a specific wait time TWAIT (for example, about 1 second) at the point in time when the target value attainment flag FTDC is set to 1, and is a countdown timer for starting a countdown. The processing is ended immediately for the period when the answer to step S16 is negative (NO). When the value of the timer TMWAIT is 0, a misfiring cylinder identification flag FMFCYL is set to 1 (step S17), misfire determination B is executed using the basic misfire determination method, and misfiring cylinders are identified (step S18). At step S18, when determination has been made on plural occasions (for example, on 3 occasions) that successive misfiring has occurred in an identified cylinder, this cylinder is recorded as being a misfiring cylinder, and the misfiring cylinder identification flag FMFCYL is returned to 0.

After executing step S18, determination is made as to whether or not the misfiring cylinder identification flag FMFCYL is 0 (step S19), and processing is ended immediately while the answer thereto is negative (NO). Processing proceeds to step S20 when the misfiring cylinder identification flag FMFCYL has returned to 0, and the target value attainment flag FTDC is returned to 0.

When a misfiring cylinder has been identified, fuel delivery and ignition signal supply to the misfiring cylinder is respectively stopped in fuel injection control processing and in ignition control processing, not illustrated in the drawings.

In the present embodiment as described above, when successive misfiring of the engine 1 has been detected by the basic misfire determination method, transmission torque reduction control is executed to decrease the transmission torque of the clutch 22 so as to match the differential rotation speed DOMG between the crankshaft rotation speed OMGCRK and the output shaft rotation speed OMGOS to the target value DOMGT. Then cylinders in which misfiring is occurring are identified based on the misfire determination parameter MFPARAM computed in the state in which the transmission torque of the clutch 22 has been decreased. The cause of not being able to correctly identify misfiring cylinders has been found to be the effect from rotation fluctuations on the output shaft side of the clutch 22, through the clutch 22, on rotation of the torsion element 21 and the crankshaft 8. It is possible to correctly identify misfiring cylinders by reducing the effect of rotation fluctuations on the output shaft (main shaft 23) side of the clutch 22 through decreasing the transmission torque of the clutch 22. Moreover, by appropriately setting slippage of the clutch 22 by decreasing the transmission torque of the clutch 22 so as to match the differential rotation speed DOMG to the target value DOMGT, the continuation of normal vehicle driving is possible during misfiring cylinder identification processing, while enabling a rise in the temperature of the clutch 22 to be suppressed.

In the present embodiment, the crank angle position sensor 10 corresponds to an engine rotation speed parameter detection unit, and the resolver 26 corresponds to an output shaft rotation speed parameter detection unit. The ECU 5 configures a misfire parameter computation unit, a misfire determination unit, part of a transmission torque reduction control unit, and a misfiring cylinder identification unit. The actuator 31 configures part of the transmission torque reduction control unit. More specifically, step S12 of FIG. 5 corresponds to the misfire determination parameter computation unit and the misfire determination unit, step S14 corresponds to the transmission torque reduction control unit, and step S15 corresponds to the misfiring cylinder identification unit.

Second Embodiment

The present embodiment is an embodiment in which a control step is added to the processing of FIG. 5 of the first embodiment, such that the engine revolutions NE do not enter range of revolutions where resonance occurs in the torsion element 21 (see FIG. 7), and is the same as the first embodiment except in the points explained below.

Figure 6:
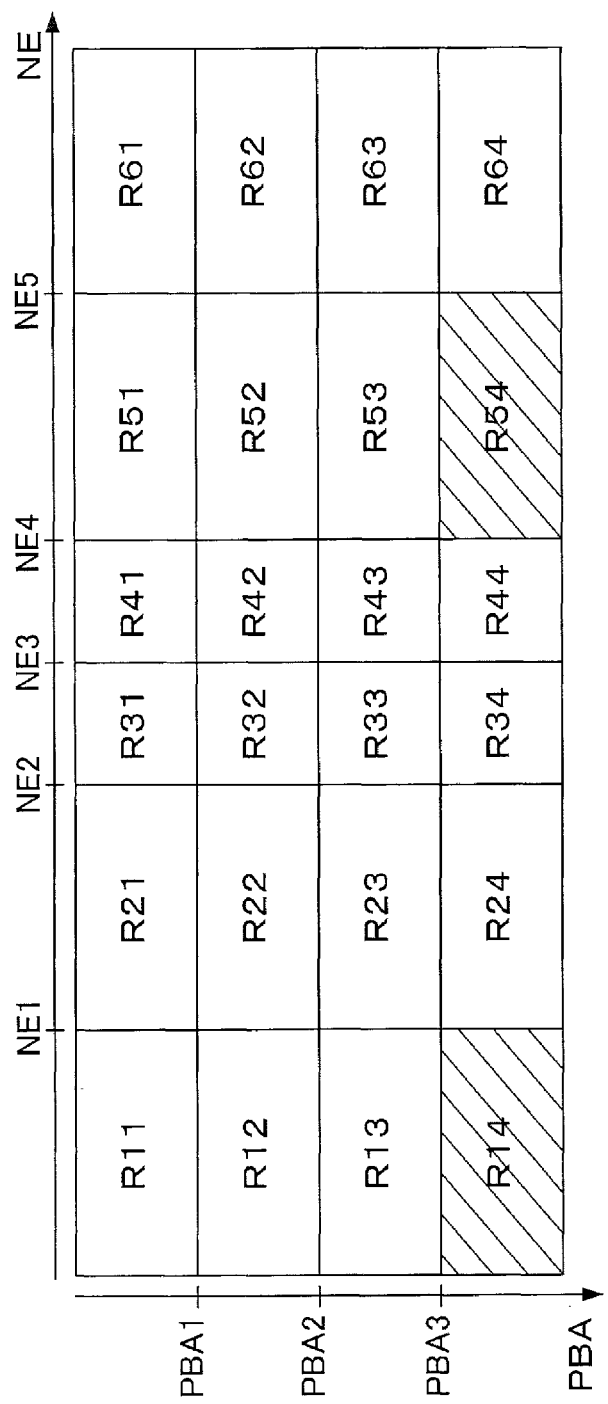
FIG. 6 is a diagram to explain engine running regions where the precision of determining misfiring cylinders is reduced in the first embodiment.

The precision of determining misfiring cylinders is greatly improved by the misfire detection processing of the first embodiment (FIG. 5); however, it has been confirmed that sometimes mistaken determination occurs in the hatched regions R14 and R54 of FIG. 6. Investigations into the cause of mistaken determination in these high load regions have found this to be the effect of resonance of the torsion element 21. In the engine 1 of the present embodiment, resonance of the torsion element 21 occurs when the engine revolutions NE (the crankshaft rotation speed OMGCRK) are in the range of from 1000 rpm to 1500 rpm and in the range of from 2250 rpm to 2750 rpm (these rotation speed ranges are referred to below as a resonance range RRES). It has been found that mistaken determination occurs in the regions R14 and R54 on the high load side due to the effects of such resonance.

Thus, in the second embodiment, resonance rotation speed avoidance control and idling rotation speed change control are executed such that the engine revolutions NE always lie outside the resonance range RRES, by respectively changing a shift map (a map to decide on the gear from the vehicle speed VP and the acceleration pedal depression amount AP) applied to gear shift control in the transmission gear unit 24 to make the engine revolutions NE always lie outside the resonance range RRES, and changing a target idling revolutions NOBJ in the idling state of the engine 1 to a value that is higher by a specific number of revolutions DNE (for example, 300 rpm). Processing is also executed to identify misfiring cylinders in a state in which transmission torque reduction control is being executed. In the idling state of the engine 1, feedback control is performed on the opening of the throttle valve 3 (air intake volume) so as to match the detected engine revolutions NE to the target idling revolutions NOBJ.

Figure 7:
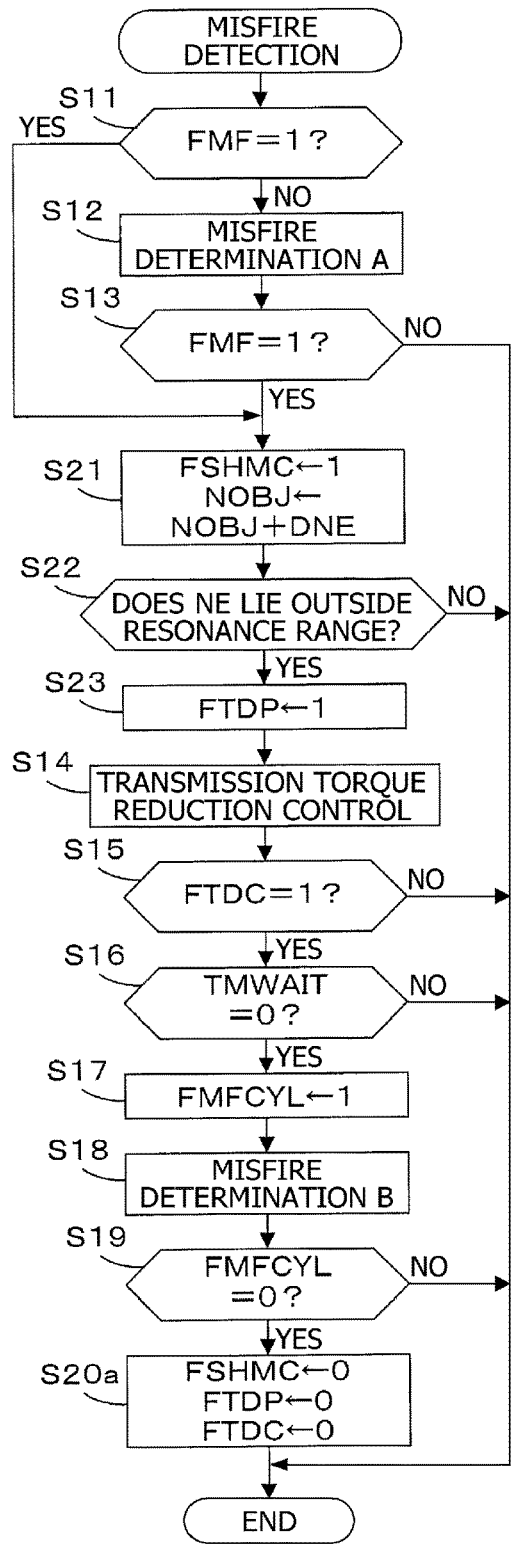
FIG. 7 is a flowchart of misfire detection processing (in a second embodiment).

FIG. 7 is a flowchart of misfire detection processing in the present embodiment. This processing is processing in which step S20 of FIG. 5 is changed to step S20a, and steps S21 to S23 are added. When the answer to step S11 or step S13 is affirmative (YES), processing proceeds to step S21, a shift map change flag FSHMC is set to 1, and the target idling revolutions NOBJ is increased by the specific number of revolutions DNE. Thereby, the revolutions when the engine 1 is idling lie outside the resonance range RRES, and gear selection is performed such that the engine revolutions NE during vehicle driving lie outside the resonance range RRES.

At step S22, determination is made as to whether or not the engine revolutions NE lie outside the resonance range RRES, and processing is ended when the answer is negative (NO). When a state in which the engine revolutions NE (the OMGCRK) lie outside the resonance range RRES has continued for a pre-set fixed period of time or greater, the answer at step S22 is affirmative (YES). When the answer at step S22 is affirmative (YES), a transmission torque reduction control permission flag FTDP is set to 1 (step S23), and processing proceeds to step S14 where transmission torque reduction control is started.

When the misfiring cylinder identification flag FMFCYL is returned to 0, processing proceeds to step S20a, and the shift map change flag FSHMC, the transmission torque reduction control permission flag FTDP, and the target value attainment flag FTDC are returned to 0.

Figure 8:
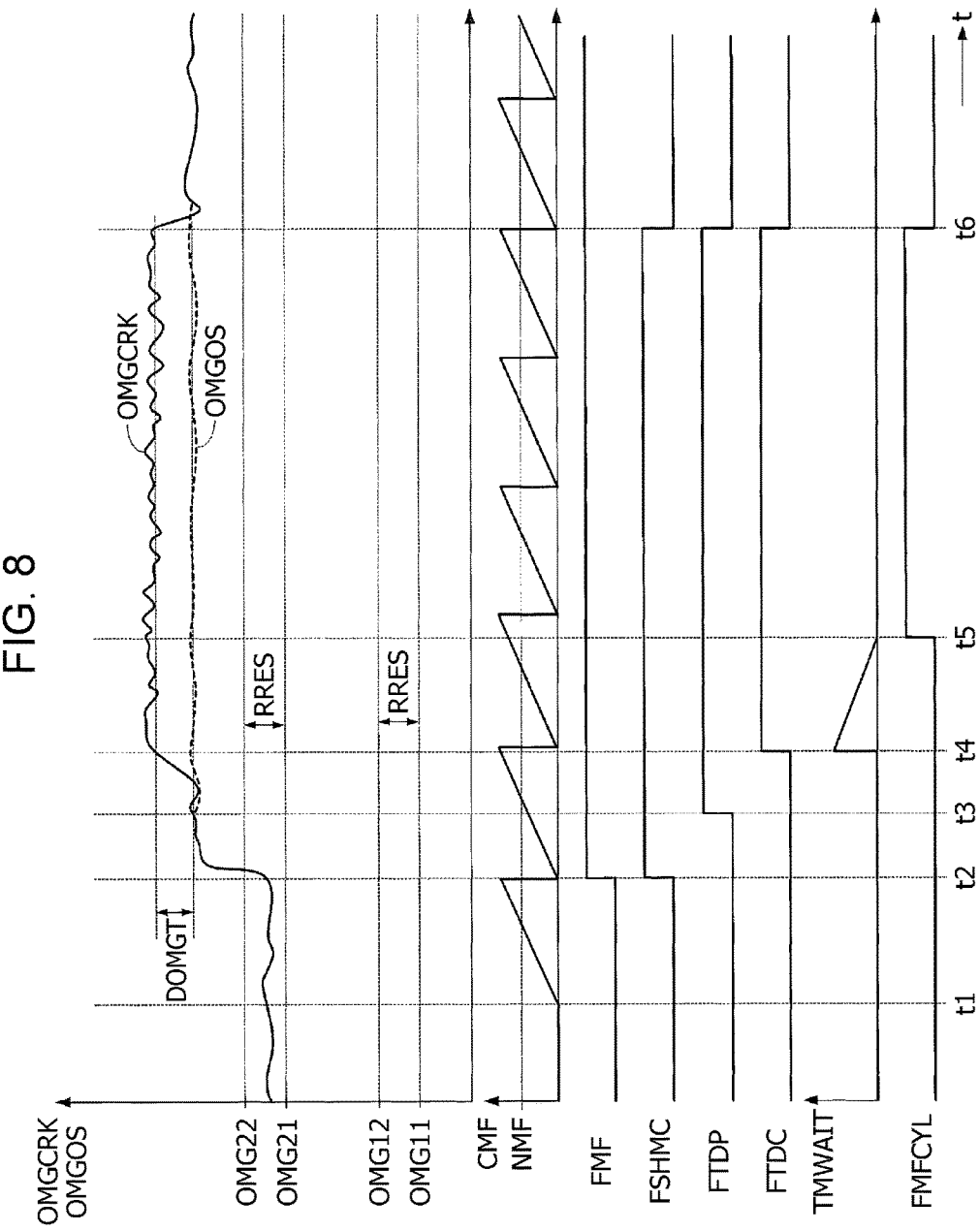
FIG. 8 is a timing chart to explain an example of operation of misfire detection processing.

FIG. 8 is a timing chart indicating movements in the crankshaft rotation speed OMGCRK (solid line), the output shaft rotation speed OMGOS during transmission torque reduction control (dashed line), a count value of a misfire detection counter CMF, the misfire detection flag FMF, the shift map change flag FSHMC, the transmission torque reduction control permission flag FTDP, the target value attainment flag FTDC, a count value of the timer TMWAIT, and the misfiring cylinder identification flag FMFCYL in the present embodiment. In FIG. 8, a range indicated from a rotation speed OMG 11 (for example, 1000 rpm) to OMG 12 (for example, 1500 rpm), and a range indicated from a rotation speed OMG 21 (for example, 2250 rpm) to OMG 22 (for example 2750 rpm), correspond to the resonance range RRES.

From a time t1, successive misfiring starts to be detected, a value of the misfire detection counter CMF increases, and subsequently exceeds the specific number of times NMF. At time t2, the misfire detection flag FMF is set to 1, and the shift map change flag FSHMC is set to 1. A down shift is performed as a result, and the crankshaft rotation speed OMGCRK increases so as to lie outside the resonance range RRES immediately after time t2. Determination of lying outside the resonance range RRES is made at time t3 (the answer at step S22 in FIG. 7 is affirmative (YES)), the transmission torque reduction control permission flag FTDP is set to 1, and transmission torque reduction control is started.

The differential rotation speed DOMG reaches the target value DOMGT at time t4, the target value attainment flag FTDC is set to 1, and countdown of the timer TMWAIT is started. The value of the timer TMWAIT becomes 0 at time t5, the misfiring cylinder identification flag FMFCYL is set to 1, and misfiring cylinder identification is performed using the misfire determination B. In the example illustrated, a misfiring cylinder is confirmed by the value of the misfire detection counter CMF exceeding the specific number of times NMF on 3 occasions, and the shift map change flag FSHMC, the transmission torque reduction control permission flag FTDP, and the target value attainment flag FTDC are returned to 0 at time t6.

As described above, the processing of FIG. 7 executes resonance rotation speed avoidance control when successive misfiring has been detected by the misfire determination A, by changing the target idling revolutions NOBJ to a value lying outside the resonance range RRES and changing the shift map. Then, cylinders in which misfiring is occurring are identified, based on the misfire determination parameter MFPARAM computed in a state in which the target idling revolutions NOBJ is changed and the resonance rotation speed avoidance control is executed, and also in which transmission torque reduction control of the clutch 22 is executed. When the crankshaft rotation speed OMGCRK lies inside the resonance range RRES at which resonance of the torsion element 21 occurs, sometimes misfiring cylinders cannot be correctly identified by executing the transmission torque reduction control of the clutch 22 alone. Thus, by changing the shift map, and by controlling the transmission gear unit 24 such that the crankshaft rotation speed OMGCRK does not lie inside the resonance range RRES, the effect of resonance of the torsion element 21 is eliminated before it occurs, enabling correct identification of misfiring cylinder. Moreover, although mistaken determination of misfiring cylinders is not liable to occur in the idling state of the engine 1, changing the target idling revolutions in advance to a value lying outside the resonance range RRES, in consideration of cases in which there is a rapid increase in engine load from the idling state, enables correct misfiring cylinder identification, even when a rapid increase in the engine load occurs.

In the present embodiment, the ECU 5 configures part of a transmission gear control unit and part of an idling rotation speed control unit. The actuator 31 configures part of the transmission gear control unit, and the throttle valve 3 and the actuator 3a configure part of the idling rotation speed control unit. Specifically, the step S21 of FIG. 7 corresponds to the transmission gear control unit and the idling rotation speed control unit.

The present application is not limited to the embodiments described above, and various modifications are possible. For example, although the embodiments described above are configured to convert the timing parameter CRME into the crankshaft rotation speed OMGCRK, so as to perform misfire determination, configuration may be made, as described in Japanese Unexamined Patent Application Publication No. 2007-198368, the entire contents of which are incorporated herein by reference, so as to perform misfire determination using the timing parameter CRME itself as an engine rotation speed parameter. Similar applies to the output shaft rotation speed OMGOS, and a timing parameter inversely proportional to the output shaft rotation speed OMGOS may be employed as an output shaft rotation speed parameter.

Moreover, although the embodiments described above are configured to detect the output shaft rotation speed OMGOS using the resolver 26, a separate sensor may be provided to detect the rotation speed of the main shaft 23.

Moreover, although in the embodiments described above an example has been given of application of the present application to a vehicle drive device including an engine with six cylinders, the present application is applicable to a vehicle drive device including an engine with plural cylinders, irrespective of the number of cylinders. Moreover, the present application is also applicable to misfire determination in a gasoline engine in which fuel is directly injected into a combustion chamber.

In the misfire determination A of the processing in FIG. 5 or FIG. 7, the misfire detection flag FMF is set to 1 when successive misfiring is detected; however, configuration may be made such that the misfire detection flag FMF is set to 1 when misfiring is determined to have occurred in any of the cylinders on a single occasion. Moreover, the second embodiment may be modified such that the target idling revolutions NOBJ is not changed at step S21, and only the shift map is changed.

A first aspect of the present application describes a vehicle drive device including an internal combustion engine having plural cylinders. A crankshaft of the engine is connected to a motive force transmission mechanism through a torsion element and a clutch, and the motive force transmission mechanism is coupled to a driveshaft of a vehicle. The vehicle drive device includes an engine rotation speed parameter detection unit that detects an engine rotation speed parameter indicating the rotation speed of the crankshaft, and an output shaft rotation speed parameter detection unit that detects an output shaft rotation speed parameter indicating a rotation speed of an output shaft of the clutch. The vehicle drive device also includes a misfire determination parameter computation unit that computes a misfire determination parameter indicating torque generated for each cylinder of the engine based on the detected engine rotation speed parameter, and a misfire determination unit that determines misfiring of the engine based on the misfire determination parameter. The vehicle drive device includes a transmission torque reduction control unit that, when misfiring of the engine has been detected by the misfire determination unit, decreases transmission torque of the clutch so as to match a difference between the engine rotation speed parameter and the output shaft rotation speed parameter to a target value, and a misfiring cylinder identification unit that identifies cylinders in which misfiring is occurring based on the misfire determination parameter computed in a state in which the transmission torque has been decreased by the transmission torque reduction control unit.

According to the above configuration, when misfiring of the engine has been detected by the misfire determination unit, the transmission torque of the clutch is decreased so as to match a difference between the engine rotation speed parameter and the output shaft rotation speed parameter to a target value, and cylinders in which misfiring is occurring are identified based on the misfire determination parameter computed in a state in which the transmission torque of the clutch has been decreased. It has been found that a cause of not being able to correctly identify misfiring cylinders is that rotation fluctuations on the output shaft side of the clutch affect the rotation of the torsion element and the crankshaft through the clutch, and correct misfiring cylinder identification is enabled by reducing the effect from rotation fluctuations on the output shaft side of the clutch by decreasing the transmission torque of the clutch. Moreover, due to decreasing the transmission torque of the clutch by matching the difference between the engine rotation speed parameter and the output shaft rotation speed parameter to a target value, the amount of clutch slip is appropriately set, enabling the continuation of normal vehicle driving during misfiring cylinder identification processing, while also enabling a rise in the temperature of the clutch to be suppressed.

A second aspect of the present application describes the vehicle drive device of the first aspect, which may be configured with the motive force transmission mechanism further including a transmission gear unit provided between the output shaft of the clutch and the drive shaft, and a transmission gear control unit for controlling the transmission gear unit. When misfiring of the engine has been detected by the misfire determination unit, the transmission gear control unit may execute resonance rotation speed avoidance control to control the transmission gear unit such that a value of the engine rotation speed parameter lies outside of a resonance rotation speed range where resonance of the torsion element occurs. The misfiring cylinder identification unit may identify cylinders in which misfiring is occurring based on the misfire determination parameter computed in a state in which the resonance rotation speed avoidance control is executed by the transmission gear control unit, and the transmission torque is decreased by the transmission torque reduction control unit.

According to the above configuration, when misfiring of the engine has been detected by the misfire determination unit, resonance rotation speed avoidance control is executed to control the transmission gear unit such that the value of the engine rotation speed parameter (the rotation speed of the crankshaft) lies outside of a resonance rotation speed range where resonance of the torsion element occurs. Moreover, the cylinders in which misfiring is occurring are identified based on the misfire determination parameter computed in a state in which the resonance rotation speed avoidance control is executed and the transmission torque of the clutch is decreased. Sometimes misfiring cylinders cannot be correctly identified by reducing transmission torque of the clutch alone when the value of the engine rotation speed parameter lies inside the resonance rotation speed range where resonance of the torsion element occurs. Thus, by controlling the transmission gear unit such that the value of the engine rotation speed parameter is away from the resonance rotation speed range, the effect of resonance of the torsion element is eliminated before it would occur, enabling correct identification of misfiring cylinders.

A third aspect of the present application describes the vehicle drive device of the second aspect, which may be configured further including an idling rotation speed control unit that controls an idling rotation speed, which is the rotation speed of the engine in an idling state, to a target rotation speed using feedback control. When misfiring of the engine has been detected by the misfire determination unit, the idling rotation speed control unit changes the target rotation speed to a value lying outside the resonance rotation speed range. The misfiring cylinder identification unit identifies cylinders in which misfiring is occurring based on the misfire determination parameter computed in a state in which the target rotation speed is being changed by the idling rotation speed control unit and the resonance rotation speed avoidance control is being executed by the transmission gear control unit, and the transmission torque is being decreased by the transmission torque reduction control unit.

According to the above configuration, when misfiring of the engine has been detected by the misfire determination unit, the target rotation speed of the idling rotation speed is changed to a value lying outside the resonance rotation speed range and the resonance rotation speed avoidance control is executed. The cylinders in which misfiring is occurring are identified based on the misfire determination parameter computed in a state in which the target rotation speed is being changed and the resonance rotation speed avoidance control is being executed, and the transmission torque of the clutch is being decreased. Although mistaken determination of misfiring cylinders is not liable to occur in the idling state of the engine, there is a higher probability of mistaken determination in cases in which there is a rapid increase in engine load from the idling state. Thus, in consideration of such cases of rapid increase in engine load, by changing the target rotation speed in advance so as to lie outside the resonance rotation speed range, correct misfiring cylinder identification is enabled, even when a rapid increase in the engine load occurs.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle drive system including an internal combustion engine having a plurality of cylinders, with a crankshaft of the engine connected to a motive force transmission mechanism through a torsion element and a clutch, and the motive force transmission mechanism coupled to a driveshaft of a vehicle, the vehicle drive device comprising:
    an engine rotation speed parameter detection unit that detects an engine rotation speed parameter indicating the rotation speed of the crankshaft;
    an output shaft rotation speed parameter detection unit that detects an output shaft rotation speed parameter indicating a rotation speed of an output shaft of the clutch;
    a misfire determination parameter computation unit that computes a misfire determination parameter indicating torque generated for each cylinder of the engine based on the detected engine rotation speed parameter;
    a misfire determination unit that determines misfiring of the engine based on the misfire determination parameter;
    a transmission torque reduction control unit that, when misfiring of the engine has been detected by the misfire determination unit, decreases transmission torque of the clutch so as to match a difference between the engine rotation speed parameter and the output shaft rotation speed parameter to a target value; and a misfiring cylinder identification unit that identifies cylinders in which misfiring is occurring based on the misfire determination parameter computed in a state in which the transmission torque has been decreased by the transmission torque reduction control unit.

2. The vehicle drive system according to claim 1, wherein:

the motive force transmission mechanism further comprises a transmission gear unit provided between the output shaft of the clutch and the drive shaft, and a transmission gear control unit for controlling the transmission gear unit;

when misfiring of the engine has been detected by the misfire determination unit, the transmission gear control unit executes resonance rotation speed avoidance control to control the transmission gear unit such that a value of the engine rotation speed parameter lies outside of a resonance rotation speed range where resonance of the torsion element occurs; and the misfiring cylinder identification unit identifies cylinders in which misfiring is occurring based on the misfire determination parameter computed in a state in which the resonance rotation speed avoidance control is executed by the transmission gear control unit and the transmission torque is decreased by the transmission torque reduction control unit.

3. The vehicle drive system according to claim 2, further comprising:

an idling rotation speed control unit that controls an idling rotation speed, which is the rotation speed of the engine in an idling state, to a target rotation speed using feedback control; wherein when misfiring of the engine has been detected by the misfire determination unit, the idling rotation speed control unit changes the target rotation speed to a value lying outside the resonance rotation speed range; and the misfiring cylinder identification unit identifies cylinders in which misfiring is occurring based on the misfire determination parameter computed in a state in which the target rotation speed is being changed by the idling rotation speed control unit and the resonance rotation speed avoidance control is being executed by the transmission gear control unit, and the transmission torque is being decreased by the transmission torque reduction control unit.

4. A vehicle drive system comprising:

an internal combustion engine including cylinders and a crankshaft;

a clutch connected to the crankshaft via a torsion element and including an output shaft;

an engine rotation speed detector to detect a crankshaft rotation speed;

an output shaft rotation speed detector to detect an output shaft rotation speed of the clutch; and a processor configured to calculate a torque generated in each of the cylinders based on the crankshaft rotation speed, determine whether misfiring occurs in the engine based on the torque calculated, decrease transmission torque of the clutch so that a difference between the crankshaft rotation speed and the output shaft rotation speed to be a target value when it is determined that misfiring occurs, and identify a misfiring cylinder among the cylinders based on the torque calculated while the transmission torque is decreased.

5. The vehicle drive system according to claim 4, wherein:

a motive force transmission mechanism comprises a transmission gear unit provided between the output shaft and a drive shaft, and a transmission gear control unit for controlling the transmission gear unit;

when misfiring of the engine has been detected by the processor, the transmission gear control unit executes resonance rotation speed avoidance control to control the transmission gear unit such that a value of the crankshaft rotation lies outside of a resonance rotation speed range where resonance of the torsion element occurs; and the processor identifies cylinders in which misfiring is occurring based on the torque calculated in a state in which the resonance rotation speed avoidance control is executed by the transmission gear control unit and the transmission torque is decreased by the processor.

6. The vehicle drive system according to claim 5, further comprising:

an idling rotation speed control unit that controls an idling rotation speed, which is a rotation speed of the engine in an idling state, to a target rotation speed using feedback control; wherein when misfiring of the engine has been detected by processor, the idling rotation speed control unit changes the target rotation speed to a value lying outside the resonance rotation speed range; and the processor identifies cylinders in which misfiring is occurring based on the torque calculated in a state in which the target rotation speed is being changed by the idling rotation speed control unit and the resonance rotation speed avoidance control is being executed by the transmission gear control unit, and the transmission torque is being decreased by processor.

7. The vehicle drive system according to claim 4, wherein the engine rotation speed detector is configured to detect an engine rotation speed parameter indicating the crankshaft rotation speed.

8. The vehicle drive system according to claim 4, wherein the output shaft rotation speed detector is configured to detect an output shaft rotation speed parameter indicating the output shaft rotation speed of the clutch.

9. The vehicle drive system according to claim 4, wherein a misfire determination parameter which corresponds to the torque is calculated based on the crankshaft rotation speed.

10. The vehicle drive system according to claim 9, wherein whether misfiring occurs in the engine is determined based on the misfire determination parameter.

* * * * *